(12) United States Patent
Loup et al.

(10) Patent No.: US 7,891,412 B2
(45) Date of Patent: Feb. 22, 2011

(54) HEAT EXCHANGER USING A STORAGE FLUID

(75) Inventors: Didier Loup, Maurepas (FR); Régine Haller, Boissy Sans Avoir (FR); Loïc Lepetit, Clenay (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 1356 days.

(21) Appl. No.: 10/573,961

(22) PCT Filed: Oct. 21, 2004

(86) PCT No.: PCT/FR2004/002863

§ 371 (c)(1),
(2), (4) Date: Mar. 29, 2006

(87) PCT Pub. No.: WO2005/040707

PCT Pub. Date: May 6, 2005

(65) Prior Publication Data

US 2007/0039714 A1    Feb. 22, 2007

(30) Foreign Application Priority Data

Oct. 21, 2003    (FR) .................................... 03 12291

(51) Int. Cl.
*F28D 15/00*    (2006.01)
*F28D 19/00*    (2006.01)

(52) U.S. Cl. .................................... 165/104.14; 165/10

(58) Field of Classification Search ............ 165/104.14, 165/104.17, 10, 153, 166–167, 170, 42; 62/244, 62/430, 434, 435, 199

See application file for complete search history.

(56) References Cited

U.S. PATENT DOCUMENTS

| | | | | |
|---|---|---|---|---|
| 6,142,221 A | * | 11/2000 | Johansson | 165/140 |
| 6,164,371 A | * | 12/2000 | Bertilsson et al. | 165/140 |
| 6,185,957 B1 | * | 2/2001 | Voss et al. | 62/513 |
| 6,343,485 B1 | * | 2/2002 | Duerr et al. | 62/434 |
| 6,540,015 B1 | * | 4/2003 | Kawachi et al. | 165/164 |
| 6,935,417 B1 | * | 8/2005 | Inoue et al. | 165/167 |
| 2002/0002837 A1 | * | 1/2002 | Shirota et al. | 62/430 |
| 2002/0088246 A1 | * | 7/2002 | Bureau et al. | 62/434 |
| 2002/0178745 A1 | | 12/2002 | Kampf | |

FOREIGN PATENT DOCUMENTS

| | | |
|---|---|---|
| EP | 1221389 A2 | 7/2002 |
| FR | 2847973 A1 | 6/2004 |
| JP | 61006596 A * | 1/1986 |

OTHER PUBLICATIONS

International Search Report for International Application No. PCT/FR2004/002863, dated Jun. 22, 2005, 2 pages.

* cited by examiner

*Primary Examiner*—Tho V Duong
(74) *Attorney, Agent, or Firm*—Howard & Howard Attorneys PLLC

(57) ABSTRACT

The invention relates to a heat exchanger, in particular for an air conditioning, ventilation and/or heating device of a motor vehicle, said heat exchanger comprising a plurality of stacked modules (100) which define two series of distinct channels for circulation of first and second heat transfer fluids and are connected to inlet and outlet ducts (101, 102, 104, 105) for both heat transfer fluids.

20 Claims, 6 Drawing Sheets

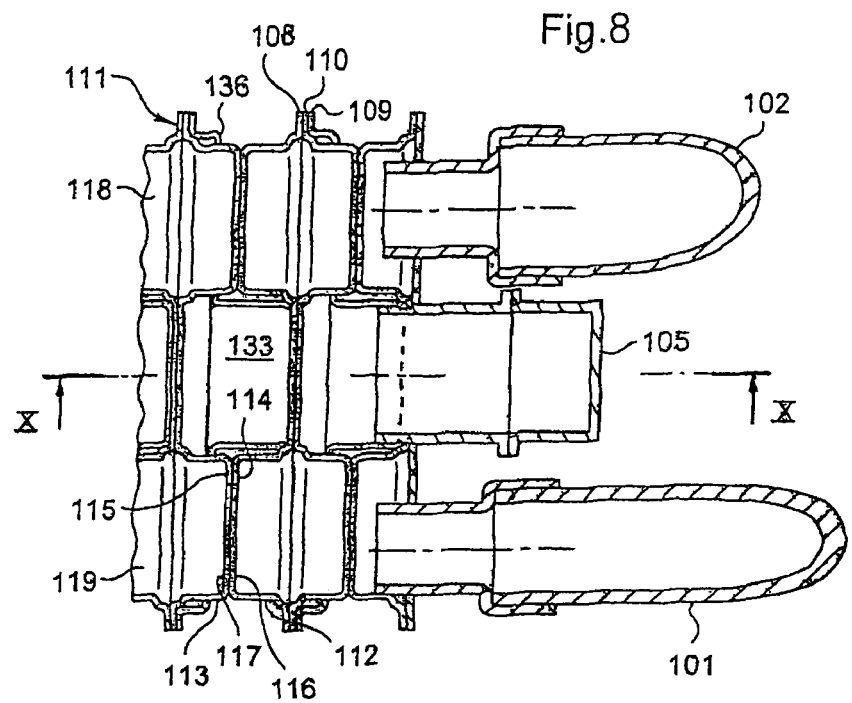
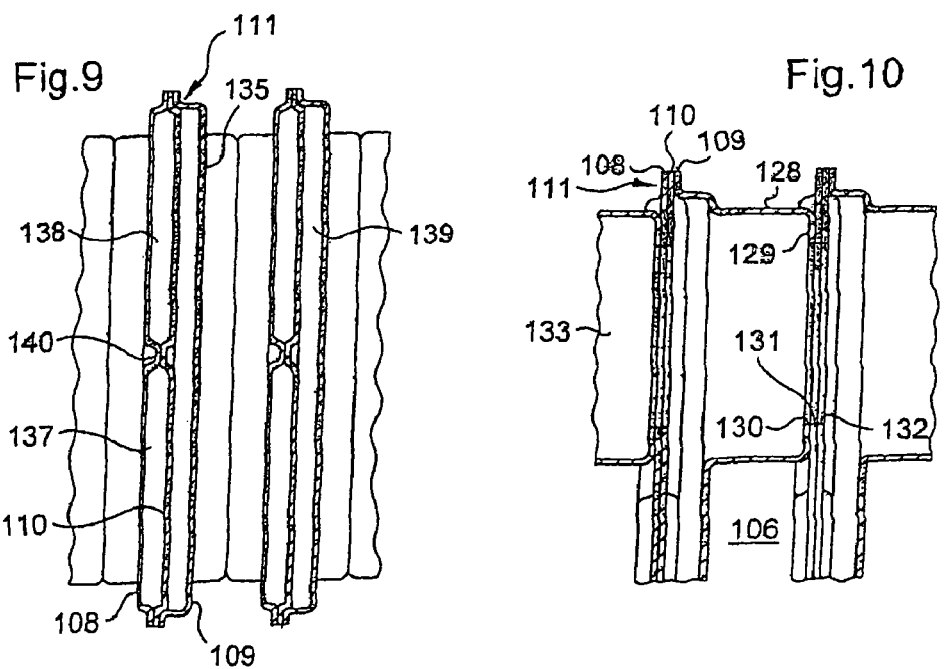

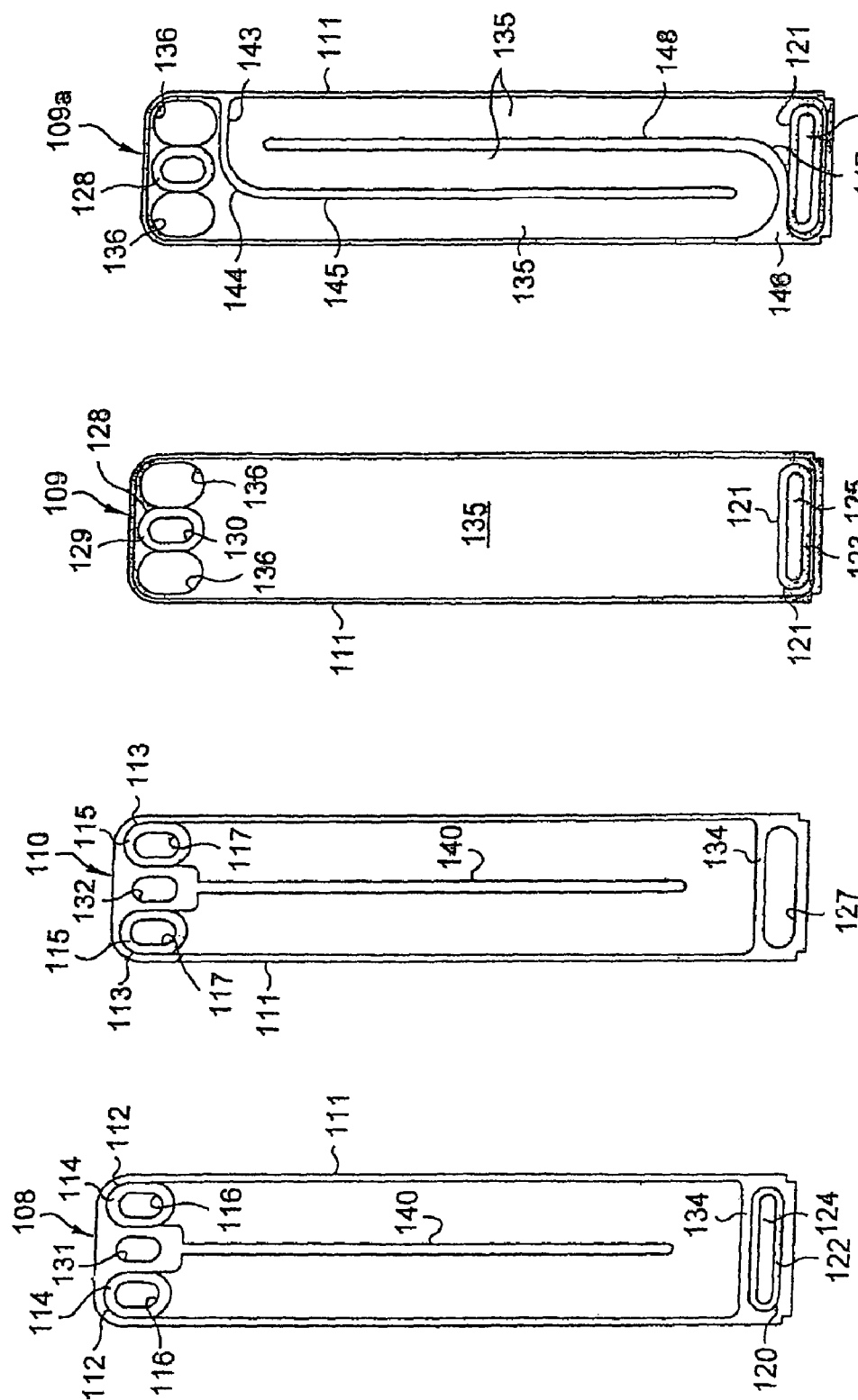

HEAT EXCHANGER USING A STORAGE FLUID

The invention relates to a heat exchanger suitable as part of a heating, ventilation and/or air-conditioning device, particularly of an automotive vehicle, comprising a plurality of modules stacked in a first direction, connected to an inlet pipe and to an outlet pipe for a first fluid and suitable for circulating said first fluid.

In the particular case of an automotive vehicle, the heat exchanger may, for example, be an air-conditioning evaporator conveying a refrigerant in order to cool the air flow and produce refrigerated air that is sent into the vehicle passenger compartment. The heat exchanger may also be a heating radiator conveying a hot fluid, usually the cooling fluid of the vehicle engine, in order to heat the air flow and produce hot air that is sent into the passenger compartment.

In a conventional air-conditioning circuit, the refrigerant crosses, in this order, a compressor, a condenser, a pressure reducer and an evaporator, before returning to the compressor. In the evaporator, the refrigerant passes from a liquid phase or a liquid/vapor phase to a vapor phase by receiving heat from the air flow which is thereby cooled. Such a circuit conventionally conveys a refrigerant consisting of a fluorocarbon like the one known by the name R 134 A.

Air-conditioning circuits conveying a refrigerant operating according to a supercritical cycle, such as $CO_2$, for example, are also known.

One drawback of the known evaporators is that their capacity to cool the air flow depends on the operation of the compressor. In other words, the air flow is no longer cooled if the compressor is stopped.

In fact, in most automotive vehicles, the compressor is driven by the engine and is therefore turned off when this engine stops running.

Within the context of pollution control standards, it is envisaged to construct automotive vehicles which stop the internal combustion engine when the vehicle is in neutral, and then restart the engine whenever necessary, using an alternator-starter. The result is that when a vehicle of this type is in neutral, the internal combustion engine being stopped, the air-conditioning is also stopped. Stopping of the internal combustion engine has the effect of stopping the compressor, causing a feeling of discomfort to the passenger(s) of the vehicle, because of a lack of cold after 10 to 12 seconds of blowing.

A similar problem may arise in the case in which the heat exchanger is a heating radiator, because the heat transfer fluid is circulated by a pump that is conventionally driven by the vehicle's internal combustion engine. Thus, stopping the engine has the effect of stopping the pump and therefore stopping the fluid circulation, causing a feeling of discomfort, especially when the outdoor temperature is very low.

It is a particular object of the invention to overcome the above drawbacks by proposing means for storing either cold (by consequently giving up heat) or on the contrary, heat, when the vehicle engine is running, and to restore this cold or heat to the passenger compartment when the engine is stopped.

The invention relates in particular to a heat exchanger of the type defined in the introduction, and provides that said modules comprise two series of distinct channels suitable for receiving said first fluid and a second fluid, the second fluid being conveyed by at least a third pipe.

Optional features of the invention, complementary or substitutive, are listed below:

One of the first and second fluids is immobile in said channels, the exchanger performing a static storage function.

The first and second fluids flow in said channels, the exchanger performing a dynamic storage function.

The first and second channels of each tube are arranged respectively on either side of an intermediate partition extending substantially perpendicular to the tube alignment direction.

The second channels have a thickness of between 1 and 5 mm in said direction.

The tubes are connected at one of their ends to a manifold bounding chambers for the first and second heat transfer fluids, two subassemblies of the first channels of the same tube terminating in two different chambers and communicating together at the opposite end of the tube, and two subassemblies of the second channels of the same tube also terminating in two different chambers and communicating together at the opposite end of the tube, in order to define U-shaped routes between the respective chambers for the first and second fluids.

The manifold comprises a profiled part with longitudinal ducts which define said chambers.

At least one of said ducts is divided by at least one transverse partition into at least two chambers in order to define, for the first fluid, a route of at least four passes in the heat exchanger.

The profiled part has first and second ducts defining the chambers which communicate with the first channels, and a third duct arranged between them, an inlet orifice and an outlet orifice for the first fluid, arranged at a first end of the manifold, communicating one with the first duct and the other with the third duct, and one of the first and second ducts communicating with the third duct in the vicinity of the second end of the manifold.

The heat exchanger comprises a plurality of modules stacked in a first direction, each formed of three mutually joined plates, that is a first plate turned toward a first end of the stack, a second plate turned toward the second end of the stack and a third intermediate plate, the plates each extending, substantially along the same contour, in the second and third directions substantially perpendicular to each other and perpendicular to the first direction., the modules being separated from each other, in at least one median region, in order to define intervals between them for the passage of an air flow in the third direction, and the plates being stamped in order to define passages in each module for the circulation of the first and second heat transfer fluids in the second direction, respectively on either side of the intermediate plate, and having, in two end regions located on either side of said at least one median region, openings for enabling the various modules to receive the first and second fluids, the plates being connected together to be sealed to the fluids around the openings, and at their periphery in each module.

The passages for the circulation of the second fluid have a thickness of between 1 and 5 mm in the first direction.

Each plate has, in a first of said end regions, first and second openings for the circulation of the first fluid in the two directions respectively, and a third opening for the circulation of the second fluid in a first direction, and, in the second of said end regions, a fourth opening for the circulation of the second fluid in the second direction.

The third opening is arranged between the first and second openings in the second direction.

The fourth opening is elongated in the second direction.

The first plate of a module and the third plate of a neighboring module have respective mutually supporting projections in which the corresponding first and second openings are arranged, the first and second openings of the second plate of said neighboring module being crossed in a sealed manner by the projections of said third plate.

The third opening of the first plate of a module is adjacent to that of the third plate of the same module and to that of the second plate of a neighboring module, the latter opening being arranged in a projection.

The first plate of a module and the second plate of a neighboring module have respective mutually supporting projections in which the corresponding fourth openings are arranged, the first and third plates of a module being connected in a sealed manner at an annular zone surrounding the projection of the first plate and the opening of the third plate.

The second direction is substantially vertical, said first end region being the upper region and the second fluid flowing upward.

The second heat transfer fluid is suitable for passing from the liquid state to the solid state when it receives cold from the first heat transfer fluid and, vice versa, when it restores the cold.

The second heat transfer fluid has a melting point of between 0 and 10° C. and preferably between 4 and 7° C.

The second heat transfer fluid has an enthalpy of fusion of at least 150 kJ/kg.

The second heat transfer fluid is selected from tetradecane, paraffins, hydrated salts and eutectic mixtures.

The heat exchange area between the first and second fluids in the heat exchanger is between 0.5 and 1.5 m$^2$.

The direct heat exchange area in contact with the second fluid in the heat exchanger is between 0.5 and 1.5 m$^2$.

At least part of the spaces provided in the heat exchanger for the circulation of the second fluid in thermal contact with the first fluid and/or with an air flow is lined with a highly porous heat-conducting foam, particularly graphite.

A further object of the invention is the use of a heat exchanger as described above in a heating, ventilation and/or air-conditioning device, particularly of an automotive vehicle, comprising at least a first closed loop in which said heat exchanger is crossed by an air flow and in which said first fluid can circulate so as to give up heat or cold to said air flow in the heat exchanger, and a second closed loop in which said second fluid can circulate between said heat exchanger and a tank so as to receive heat or cold from the first heat transfer fluid in the heat exchanger to store it in the tank to restore it to the air flow in the heat exchanger, according to the heating or cooling capacity produced by the first loop and the air flow treatment requirements.

The second loop advantageously contains between 200 and 500 g of the second fluid.

The features and advantages of the invention are described in greater detail in the description below, with reference to the drawings appended hereto.

FIG. 8 is a partial cross section along VIII-VIII of FIG. 7.

FIG. 9 is a partial cross section along IX-IX of FIG. 7.

FIGS. 10 and 11 are partial cross sections along X-X of FIG. 8, respectively of the upper part and the lower part of the evaporator.

FIGS. 12 to 14 are front views of the three plates comprising a module of the evaporator of FIGS. 7 to 11.

FIG. 15 shows a replacement plate.

Figure 1:
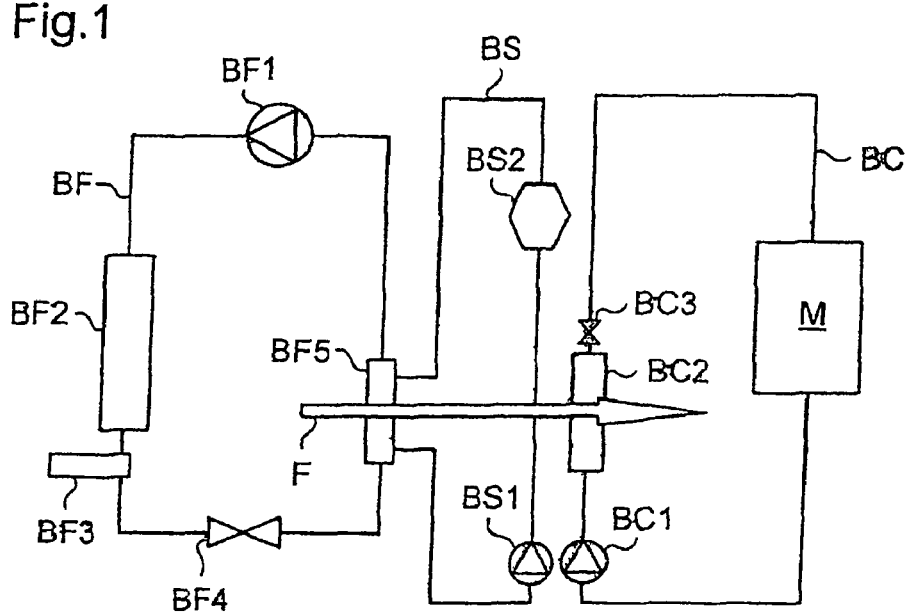
FIG. 1 is a circuit diagram of a device using an evaporator according to the invention for providing air-conditioning in the passenger compartment of an automotive vehicle.

FIG. 1 shows an air-conditioning device of an automotive vehicle. This device conventionally comprises a refrigerant loop BF in which the fluid passes in succession through a compressor BF1, a condenser BF2, a tank or "bottle" BF3, a pressure reducer BF4 and an evaporator BF5 before returning to the compressor. The device also comprises a heating loop BC in which the cooling fluid of the vehicle engine M flows under the action of a pump BC1, driven by the engine M, the loop BC further containing a heating radiator BC2 and solenoid valves BC3 for controlling the flow rate of fluid in this radiator. An air flow shown by the arrow F passes in succession through the evaporator BF5 and the radiator BC2 to be brought to a desired temperature before being introduced into the vehicle passenger compartment.

According to one embodiment of the invention, the evaporator BF5 is also part of a loop BS that further contains an electric circulating pump BS1 and a fluid storage tank BS2. As shown in detail below, the loop BS contains a heat transfer fluid that is capable of exchanging heat with the refrigerant and with the air flow F in the evaporator BF5.

During the initial operating period of the device, the pump BS1 is stopped and the fluid does not flow in the loop BS. Only the small amount of this fluid present in the evaporator BF5 is cooled by the refrigerant, enabling rapid temperature conditioning of the evaporator. As soon as the desired temperature for the evaporator or for the air flow F is reached, the pump BS1 is started, so that cooled fluid flows in the loop BS, causing a storage of cold in the tank BS2. In case the engine, and consequently the compressor BF1, is stopped, the circulation of the fluid in the loop BS continues under the action of the pump BS1, and this fluid takes over from the refrigerant to cool the air flow F by extracting cold from the tank BS2.

Figure 2:
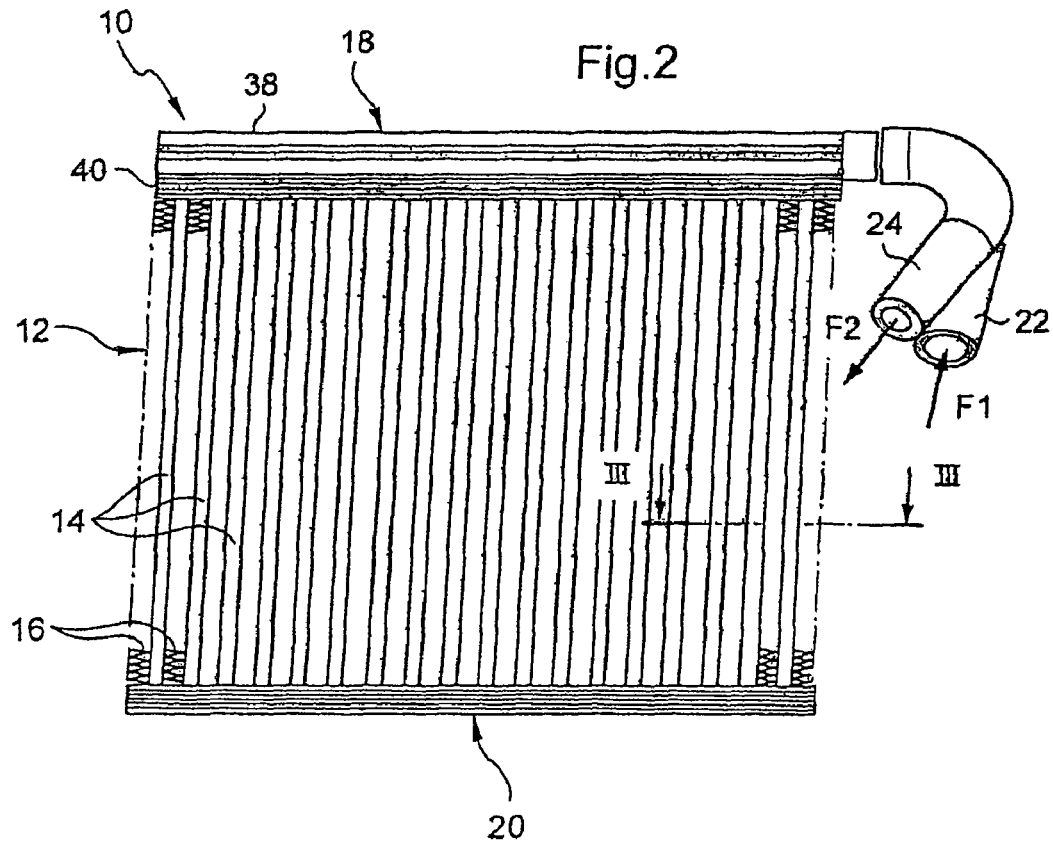
FIG. 2 is an elevation view of an evaporator according to the invention.

FIG. 2 shows an evaporator 10 according to the invention which may constitute the evaporator BF5 in FIG. 1. This evaporator comprises a bundle 12 formed from a plurality of parallel tubes 14 alternating with corrugated inserts 16 supplying heat exchange areas. The bundle 12 is inserted between two manifolds, that is a manifold 18 placed here in the upper part and a manifold 20 placed here in the lower part. The manifold 18 is equipped with an inlet pipe 22 for the refrigerant in the liquid phase or in the liquid/vapor phase and an outlet pipe 24 for the refrigerant in the gas phase. The refrigerant enters the pipe 22 as shown by the arrow F1 and exits the pipe 24 as shown by the arrow F2 after having exchanged heat with an air flow that flushes the bundle 12 as shown by the arrows F in FIG. 2. As in a conventional evaporator, the tubes 14 comprise circulating channels for the refrigerant which thereby exchanges heat with the air flow.

The refrigerant in the liquid phase or in the liquid/vapor phase is converted to the vapor phase by absorbing heat, thereby cooling the air flow.

The tubes 14 of the invention are different from the tubes of conventional evaporators insofar as they offer a dual function, that is, to permit the circulation of the refrigerant, and also, according to one embodiment of the invention, the circulation of the fluid of the loop BS which is then a heat transfer fluid.

Figure 3:
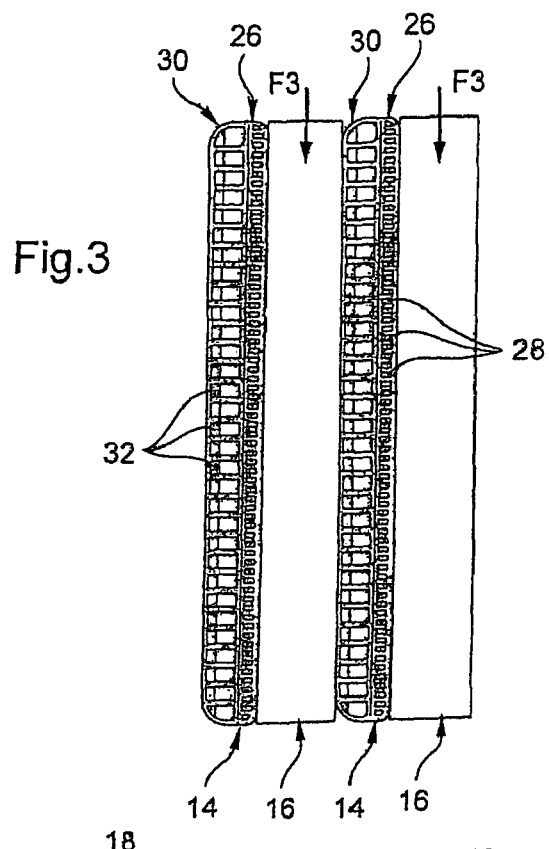
FIG. 3 is a partial cross section along III-III of FIG. 2.

As shown in FIG. 3, the tube 14 comprises two parts in the form of plates, that is, a first part 26 in which channels 28 are formed for the circulation of the refrigerant, and a second part 30 in which channels 32 are formed for the circulation of the heat transfer fluid.

The plate 26 is made by extruding a metal material, preferably aluminum or an aluminum-based alloy. In the example, the portion or plate 26 comprises a row of channels 28 each having a substantially rectangular cross section and it is bounded by two large parallel sides.

The plate 30 is also formed by extrusion of a similar metal material and it comprises a row of channels 32 each having a generally rectangular cross section, except for the channels adjacent to the lateral edges of the plate 30. This plate 30 is bounded by two large parallel sides. One of the large sides of the plate 26 is connected to one of the large sides of the plate 30, for example, by brazing to form an integral unit. The corrugated inserts 16 are advantageously formed from the same metal material as the plates.

The channels 28 have internal dimensions and wall thicknesses selected taking account of the type and operating pressures of the refrigerant used.

Thus, in the case of a conventional refrigerant, such as the fluid R 134 A, the channels 28 have a hydraulic diameter generally of between 1 and 2 mm, the burst pressures usually being about 36 bar.

In contrast, in the case of a refrigerant such as $CO_2$, the channels generally have dimensions of between 0.5 and 1 mm, the burst pressures usually being about 250 bar.

The channels 32 are intended for the circulation of the heat storage fluid.

By way of example, the cross section of the channels 32 may have a height of about 3 mm and a width of about 1 mm, these dimensions obviously being subject to variations. These dimensions and the thicknesses of the walls surrounding the channels 32 are selected also taking account of the pressure requirements. The pressures of the heat transfer fluid are relatively low, generally lower than 5 bar.

The total quantity of heat transfer fluid depends on the heat (cold) energy to be transferred to the air flow to be sent to the passenger compartment.

Figure 4:
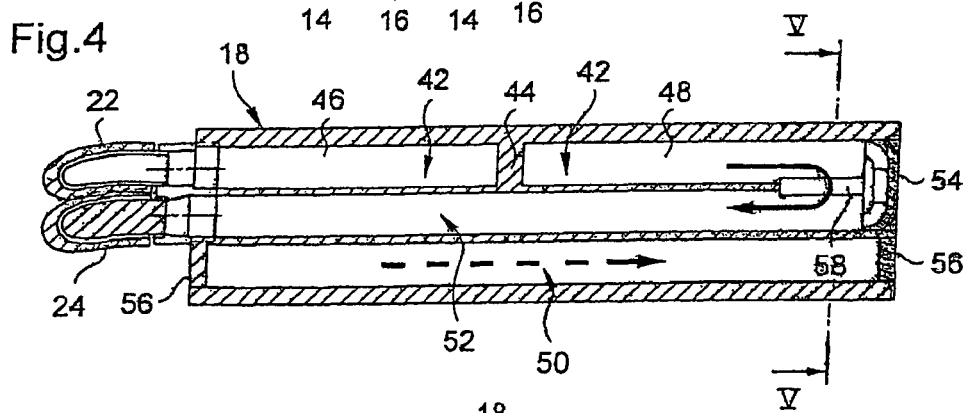
FIG. 4 is a longitudinal cross section of the manifold of the evaporator, along IV-IV of FIG. 5.
Figure 5:
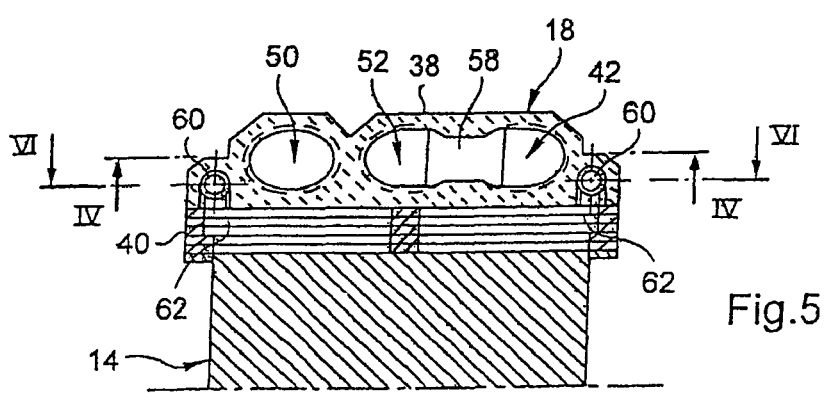
FIG. 5 is a partial view of the evaporator, in a cross section along V-V of FIG. 4.

Reference should now be made to FIGS. 4 and 5 for a particular description of the structure of the manifold 18 in the evaporator of FIG. 1. The manifold 18 comprises a profiled part 38 and a manifold plate 40 formed from the superimposition of several plates bounding flow openings or passages.

The profiled part 38 has an elongate shape and internally bounds three parallel ducts for the refrigerant. One duct 42 extending along one side of the profiled part is divided by a joined partition 44 in order to form an inlet compartment 46 and an intermediate compartment 48. At the opposite end of the duct 42 is a duct 50 forming a flow compartment. Another duct 52 placed between the ducts 42 and 50 forms an intermediate compartment. The inlet pipe 22 communicates with the compartment 46, while the outlet pipe 24 communicates with the compartment 52. The compartment 42 and the compartment 52 are closed by a plug 54 at the end of the part 38 opposite the pipes 22 and 24, while the compartment 50 is closed at its two ends by plugs 56.

The manifold 20 is formed from a stack of plates which bound appropriate passages (not shown) to make all the channels 28 on the one hand and all the channels 32 of the same tube on the other communicate with one another.

Similarly, the abovementioned passages of the manifold plate 40 cooperate with passages of the profiled part 38 to establish appropriate communication between the compartments 46, 48, 50 and the ducts 60 of the manifold 18 on the one hand, and the channels 28 and 32 of the tubes on the other.

In the example shown, the refrigerant circulates in four passes in the evaporator. It first enters the compartment 46 and goes on to compartment 50, twice through the channels 28 (passes 1 and 2) and is then conveyed to the compartment 48 again passing twice through the channels 28 (passes 3 and 4). From there, the fluid reaches the compartment 52 via an opening 58 in the partition between the ducts 42 and 52, in the vicinity of the plug 54. The fluid then reaches the outlet 24.

As also shown in FIG. 5, the profiled part 38 of the manifold bounds two longitudinal ducts 60 which communicate via passages 62 with the channels 32 of the tubes 14. In this way, the two ducts 60 serve to establish communication between the channels 32 of the various tubes. In the same way as the ducts 42 and 52, the ducts 60 are blocked at one end of the manifold and open at the other end to communicate with the rest of a secondary cold storage loop such as the loop BS in FIG. 1.

Figure 6:
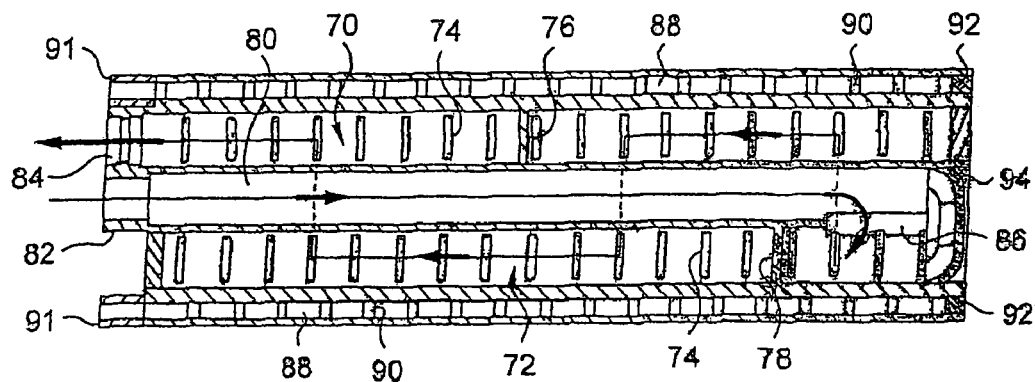
FIG. 6 is a cross section of a variant of the manifold of the evaporator, along VI-VI of FIG. 5.

The manifold shown in FIG. 6 differs from the one in FIG. 4 in two points. On the one hand, each of the side ducts 70, 72 for the refrigerant, which communicate with the channels 28 of the tubes via openings 74, is divided longitudinally by a partition 76, 78, these two partitions being offset to each other in the longitudinal direction of the manifold, whereby, in a known manner, in the example in FIG. 6, a fluid circulation occurs in six passes instead of four. On the other hand, it is the median duct 82 that is connected to the fluid inlet pipe 82, the side duct 70 being connected to the outlet pipe 84, while the other side duct 72 is connected to the median duct 80 via a communicating opening 86. Obviously, according to the number of transverse partitions, the number of passes may be different from 4 or from 6, the median duct able to be connected either to the inlet pipe or to the outlet pipe. FIG. 6 also shows the ducts 88 for the storage fluid, similar to the ducts 60 in FIG. 5, which communicate with the channels 32 of the tubes via openings 90. These channels communicate with the inlet and outlet pipes 91 at their end located to the left of the figure, that is, on the side on the pipes 82 and 84, and are blocked by plugs 92 at the opposite end, that is, on the side of the plug 94 common to the ducts 72 and 80.

Figure 7:
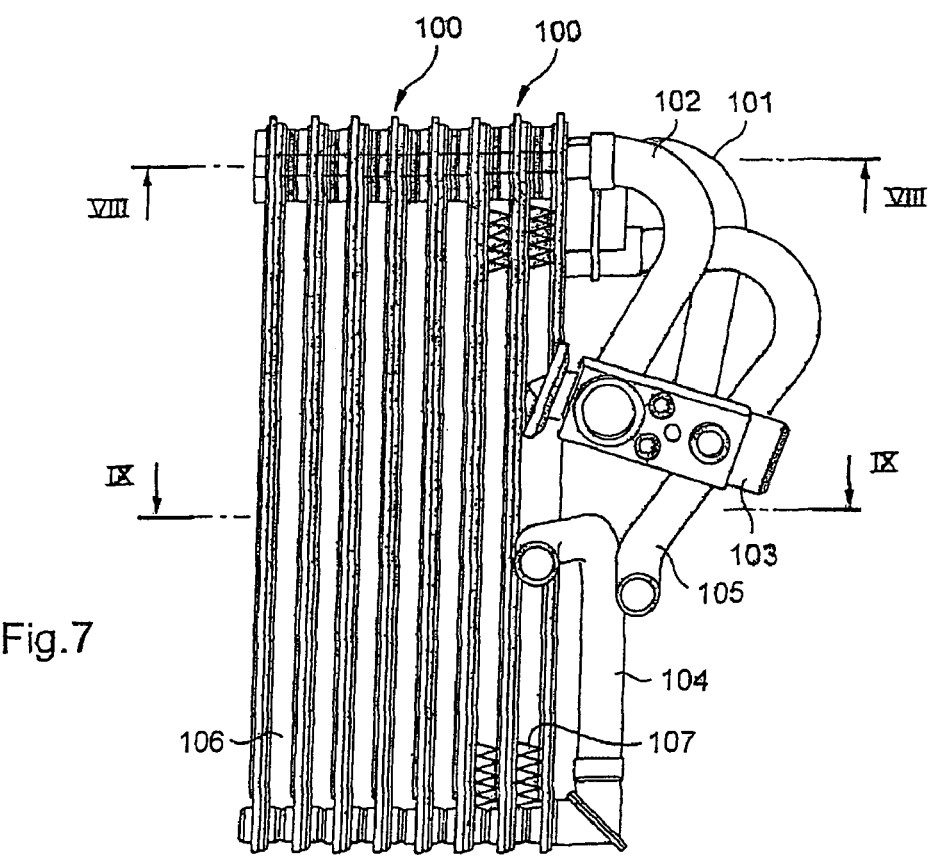
FIG. 7 is a partial elevation view of another evaporator according to the invention.

FIGS. 7 to 11 show an evaporator of different construction from those of FIGS. 2 to 6, also usable in the device in FIG. 1. This evaporator comprises a stack of modules 100 each formed from three stamped plates. The partial elevation view in FIG. 7 shows a number of the modules 100, the closest to the right end of the stack that has the inlet and outlet pipes 101, 102 for the refrigerant, connected to a pressure-reducing member, for example a pressure reducer 103 in the embodiment shown, and the inlet and outlet pipes 104, 105 for the heat storage fluid. As shown in the figure, the modules 100 are in mutual contact in an upper region and in a lower region, and have between them, in a median region extending along most of the height of the evaporator, intervals 106 for the passage of the air flow, which are lined with corrugated inserts 107 similar to the inserts 16 in FIGS. 2 and 3. The three plates 108, 109, and 110 making up each module have the same substantially rectangular contour, and each has a peripheral edge 111 located in a plane perpendicular to the stacking direction, that is, the left-right direction in FIG. 7. The plates 108, 110 and 109, shown separately in FIGS. 12 to 14 respectively, are arranged in this order from left to right in FIGS. 7 to 11. As shown in FIGS. 8 to 11, which show partial cross sections along planes parallel to the stacking direction, the peripheral edges 111 of the three plates are mutually joined and brazed to be sealed to the fluids. As shown in FIG. 8, the outlet pipe 105 of the storage fluid is connected to the upper end region of the modules, at mid-width thereof, while the inlet and outlet pipes 101, 102 of the refrigerant are connected in the same upper region, laterally on either side of the pipe 105. It is advantageous for the inlet and outlet pipes 104, 105 of the storage fluid to be located respectively in the lower part and the upper part of the heat exchanger in order to remove the residual gases.

Facing each of the pipes 101 and 102, the plate 108 of one module and the plate 110 of the neighboring module are stamped in order to form respective projections 112, 113 of which the flat tops 114, 115 are mutually supporting and are drilled with coinciding openings 116, 117. The flat tops 114, 115 are brazed together in a sealed manner around the openings 116, 117 in order to form, through the stack, longitudinal ducts 118, 119 connected respectively to the pipes 101 and 102.

Figure 11:
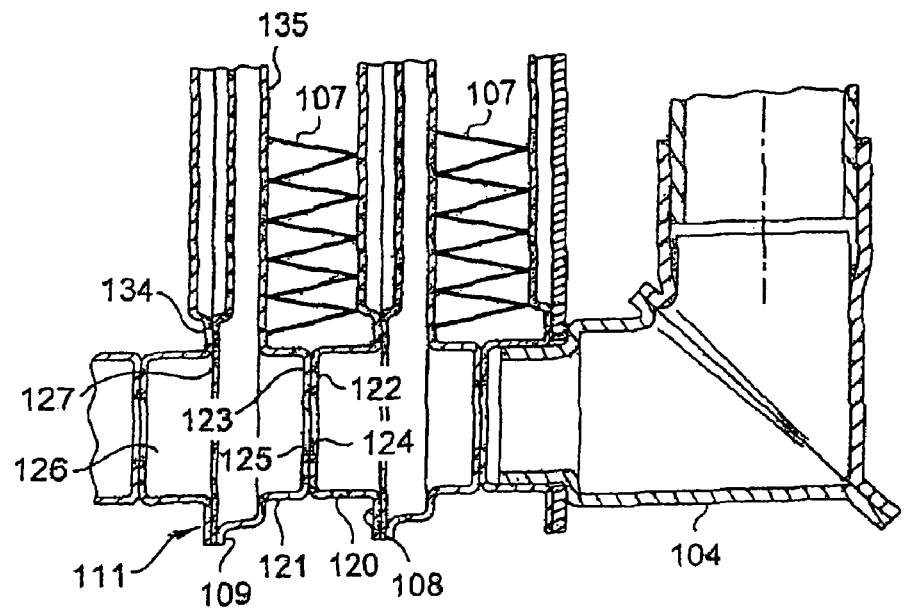

Facing the storage fluid inlet pipe 104, as shown in particular in FIG. 11, the plate 108 of one module and the plate 109 of a neighboring module have respective projections 120, 121 of which the flat tops, 122, 123 are applied against one another and are drilled with coinciding openings 124, 125 around which they are brazed together in a sealed manner to the fluids. These projections define a longitudinal duct 126 that communicates with the pipe 104, openings 127 being arranged in the plates 110 to ensure the continuity of this duct.

Facing the storage fluid outlet pipe 105, as shown in FIGS. 8 and 10, the plates 108 and 110 of each module extend into the planes of their respective peripheral edges 111, and the plate 109 of one module has a projection 128 of which the flat top 129 bears against the plate 110 of the neighboring module, the top 129 and the plates 108 and 110 having respective coinciding openings 130, 131 and 132 around which they are brazed together in a sealed manner to the fluids. The projections 128 bound a longitudinal duct 133 communicating with the pipe 105.

In the region at mid-height of the modules, as shown in FIGS. 9 and 11, the plates 108 and 110 generally extend along planes parallel to the planes of their peripheral edges 111, and are separated from one another. However, these plates are brazed together in a sealed manner in a zone 134 (FIG. 11) located immediately above the duct 126 and extending along the whole length of the module, up to the vertical sides of the edges 111, and also along a median vertical line corresponding to the tops of the respective ribs 140 (FIG. 9) formed by stamping, which connect at the upper sides of the peripheral edges 111 and extend up to a certain distance above the zone 134. The plates 108 and 110 hence together define a U-shaped route between the ducts 118 and 119, of which the branches 137, 138 are located on either side of the ribs 140 and are connected to one another between the bottom end thereof and the zone 134. The projections 120, 121 and the associated openings are advantageously elongated horizontally and may extend over nearly the whole width of the evaporator.

The plate 109 of each module extends, over its entire area with the exception of the peripheral edge 111 and the projections 121 and 128, along a plane parallel to the plane of its peripheral edge, and separated from the plate 110. The projections 121 and 128 are formed from this plane portion 135 and the projections 113 pass through the openings 136 formed therein in a sealed manner. The plane portion 135 together with the plate 110 bounds a space 139 providing a vertical upward route for the storage fluid from the duct 126 to the duct 133, enabling this fluid to circulate without the emission of noise due to degassing and without any oil retention problem. An insert, not shown, may be provided in the space 139 to promote the heat exchange.

FIG. 15 shows a plate 109a which may be used to replace the plate 109 in the stack in FIGS. 7 to 11, without other changes. The elements of this plate, similar to the corresponding elements of the plate 109, are denoted by the same reference numerals. The plate 109a differs from the plate 109 by the presence of two ribs formed by stamping from the plane portion 135 and of which the tops are brazed in a sealed manner to the plate 110 of the same module. A first rib comprises a horizontal region 143 which connects to the peripheral edge 111 on one of the vertical sides of the plate (to the right in the figure), immediately below the openings 136, followed by a bend 144 and a vertical region 145 which extends downward to the vicinity of the projection 121. The second rib comprises a region 146 which extends substantially horizontally and connects to the peripheral edge 111 on the opposite side of the plate (to the left in the figure), immediately above the projection 121, followed by a bend 147 and a vertical region 148 which extends upward to the vicinity of the openings 136. The bottom end of the region 145 and the top end of the region 148 are located facing the regions 146 and 143 respectively. The ribs 143 and 148, together with the peripheral edge 111, bound an S-shaped route for the second fluid, comprising, from the duct 126, a first upward branch comprised between the right-hand side of the plate and the rib 146-148, a second downward branch comprised between the two ribs and a third upward branch comprised between the left-hand side of the plate and the rib 143-145 and terminating at the duct 133, the regions 145 and 148 being arranged so that these three branches substantially have the same width. Furthermore, the region 146 broadens upward in the direction of the left-hand side of the plate in order to form a roundoff at the transition between the second and third branches of the route.

The examples of heat exchangers described may be used both with a static storage fluid and with a circulating storage fluid.

All or part of the spaces provided in the evaporator for the circulation of the heat transfer fluid in thermal contact with the air flow can be lined with a highly porous, heat-conducting foam, for example, a graphite foam from Pocofoam with a porosity of 90% and a conductivity of 150 W/m/° C. and having a very high specific surface area. Such a foam is advantageously compressed in the channels thermally connected with the refrigerant and with the air flow.

As indicated above, the number of passes in an evaporator according to the invention may be different from 4 and from 6, and may be any even number 2n, where n is any integer.

The heat storage fluid, qualified above as heat transfer fluid, may also be a phase change fluid, that is, a fluid of which the melting point is between 0° C. and 10° C.

The phase change fluid may consist of water, but this has the drawback that this water expands when it passes from the liquid state to the solid state and may give rise to icing.

It is preferable to use phase change fluids having a melting point of between 4° C. and 7° C. By way of example of such materials, mention can be made in particular of the materials of the family of paraffins, hydrated salts and eutectic compounds. Among the paraffins, mention can be made in particular of the product denoted by the trade name RT5 from Rubitherm.

One advantageous material is a paraffin with a specific gravity of 0.8. It is preferable to use phase change materials having an enthalpy of conversion equal to 150 kJ/kg or higher. Preferably, the melting point is higher than 0° C. to avoid icing problems and above all, to avoid excessively penalizing the thermodynamic cycle by a low pressure that is too low. Moreover, the melting point should preferably be lower than 10° C. so that, by recovering the stored energy, sufficiently low temperatures can be obtained to meet the comfort requirements.

The total quantity of heat transfer fluid present in the loop BS in FIG. 1 depends on the heat energy to be transferred to the air flow F during periods when the engine M is stopped. Studies have shown that in most cases, the duration of these periods is less than 30 seconds. In order to bring the air from 25° C. and 40% relative humidity upstream of the evaporator to 10° C. and 100% relative humidity downstream of the evaporator, the heating power necessary for a throughput of 350 kg/h is about 1500 W, or an energy of 45 000 J to be transferred in 30 seconds. This energy is supplied by the melting of 300 g of phase change material having an enthalpy of fusion of 150 kJ/kg. In general, the quantity of phase change material may be between 200 and 500 g. The heat exchange area between the refrigerant and the phase change material, and between the phase change material and the air flow, supplied for example by the inserts 16 and 107 described above, is advantageously between 0.5 and 1.5 m².

Figure 16:
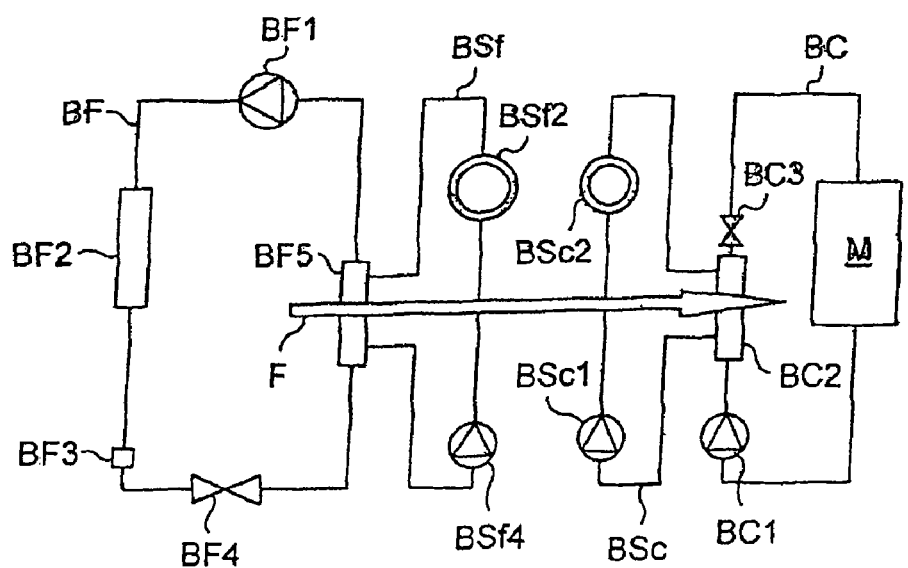
FIG. 16 is a diagram similar to FIG. 1 relative to a variant of the device.

FIG. 16 shows the same elements as in FIG. 1, denoted by the same reference numerals, but the letter "f" is added after the letter "S" in the reference numeral of the cold storage loop, which becomes BSf, and in those of the components of this loop. The device in FIG. 16 differs from the one in FIG. 1 by the addition of a heat storage loop BSc associated with the radiator BC2 and similar to the loop BSf, hence comprising, in addition to the radiator, an electric circulating pump BSc1 and a storage tank BSc2 for a heat transfer fluid that is capable of exchanging heat with the cooling fluid and with the air flow F in the radiator BC2.

Obviously, the invention could also not use a cold storage loop associated with an evaporator, and only use a heat storage loop associated with a radiator such as BC2.

The invention claimed is:

1. A heat exchanger suitable as part of a heating, ventilation and/or air-conditioning device, particularly of an automotive vehicle, said heat exchanger comprising:

a plurality of modules (14, 100) stacked in a first direction, connected to an inlet pipe (22, 82, 101) and to an outlet pipe (24, 84, 102) for a first fluid and suitable for circulating said first fluid, characterized in that said modules comprise two series of distinct channels (137, 138, 139) suitable for receiving said first fluid and a second fluid, the second fluid being conveyed by at least a third pipe (91, 104, 105); and the plurality of modules (100) each being formed of three mutually joined plates, that is a first plate (108) turned toward a first end of the stack, a second plate (109) turned toward a second end of the stack and a third intermediate plate (110), the plates each extending, substantially along the same contour, in second and third directions substantially perpendicular to each other and perpendicular to the first direction, the modules being separated from each other, in at least one median region, in order to define intervals (106) between them for the passage of an air flow in the third direction, and the plates being stamped in order to define the channels (137-139) in each module for the circulation of the first and second heat transfer fluids in the second direction, respectively on either side of the intermediate plate (110), and having, in two end regions located on either side of said at least one median region, openings (116, 117, 124, 125, 127, 130, 131, 132, 136) for enabling the various modules to receive the first and second fluids, the plates being connected together to be sealed to the fluids around the openings, and at their periphery (111) in each module;

each plate having, in a first of said end regions, first and second openings (116, 117, 136) for the circulation of the first fluid in the two directions respectively, and a third opening (130, 131, 132) for the circulation of the second fluid in the first direction, and, in the second of said end regions, a fourth opening (124, 125, 127) for the circulation of the second fluid in the second direction.

2. The heat exchanger as claimed in claim 1, in which one of the first and second fluids is immobile in said channels, the exchanger performing a static storage function.

3. The heat exchanger as claimed in claim 1, in which the first and second fluids flow in said channels, the exchanger performing a dynamic storage function.

4. The heat exchanger as claimed in claim 1, in which the channels for the circulation of the second fluid have a thickness of between 1 and 5 mm in the first direction.

5. The heat exchanger as claimed in claim 1, in which the third opening is arranged between the first and second openings in the second direction.

6. The heat exchanger as claimed in claim 1, in which the fourth opening is elongated in the second direction.

7. The heat exchanger as claimed in claim 1, in which the first plate (108) of a module and the third plate (110) of a neighboring module have respective mutually supporting projections (112, 113) in which the corresponding first and second openings (116, 117) are arranged, the first and second openings (136) of the second plate of said neighboring module being crossed in a sealed manner by the projections of said third plate.

8. The heat exchanger as claimed in claim 1, in which the third opening (131) of the first plate (108) of a module is adjacent to that (132) of the third plate (110) of the same module and to that (130) of the second plate (109) of a neighboring module, the latter opening being arranged in a projection (128).

9. The heat exchanger as claimed in claim 1, in which the first plate (108) of a module and the second plate (109) of a neighboring module have respective mutually supporting projections (120, 121) in which the corresponding fourth openings (124, 125) are arranged, the first and third plates (110) of a module being connected in a sealed manner at an annular zone (111, 134) surrounding the projection (120) of the first plate and the opening (127) of the third plate.

10. The heat exchanger as claimed in claim 1, in which the second direction is substantially vertical, said first end region being the upper region and the second fluid flowing upward.

11. The heat exchanger as claimed in claim 1, constituting an air-conditioning evaporator, in which the second heat transfer fluid is suitable for passing from the liquid state to the solid state when it receives cold from the first heat transfer fluid and, vice versa, when it restores the cold.

12. The heat exchanger as claimed in claim 11, in which the second heat transfer fluid has a melting point of between 0 and 10° C. and preferably between 4 and 7° C.

13. The heat exchanger as claimed in either of claims 11 and 12, in which the second heat transfer fluid has an enthalpy of fusion of at least 150 kJ/kg.

14. The heat exchanger as claimed in claim 11, in which the second heat transfer fluid is selected from tetradecane, paraffins, hydrated salts and eutectic mixtures.

15. The heat exchanger as claimed in claim 1, in which the heat exchange area between the first and second fluids in the heat exchanger is between 0.5 and 1.5 m².

16. The heat exchanger as claimed in claim 1, in which the direct heat exchange area in contact with the second fluid in the heat exchanger is between 0.5 and 1.5 m².

17. The heat exchanger as claimed in claim 1, in which at least part of the spaces provided in the heat exchanger for the circulation of the second fluid in thermal contact with the first fluid and/or with an air flow is lined with a highly porous heat-conducting foam.

18. A heating, ventilation and/or air-conditioning comprising:

a heat exchanger having a plurality of modules (14, 100) stacked in a first direction, connected to an inlet pipe (22, 82, 101) and to an outlet pipe (24, 84, 102) for a first fluid and suitable for circulating said first fluid, characterized in that said modules comprise two series of distinct channels (137, 138, 139) suitable for receiving said first fluid and a second fluid, the second fluid being conveyed by at least a third pipe (91, 104, 105); and at least a first closed loop (BF, BC) in which said heat exchanger (BF5, BC2) is crossed by an air flow (F) and in which said first fluid can circulate so as to give up heat or cold to said air flow in the heat exchanger (BF5, BC2), and a second closed loop (BSf, BSc) in which said second fluid can circulate between said heat exchanger (BF5, BC2) and a tank (BSf2, BSc2) so as to receive heat or cold from the first heat transfer fluid in the heat exchanger to store it in the tank (BSf2, BSc2) to restore it to the air flow (F) in the heat exchanger, according to the heating or cooling capacity produced by the first loop and the air flow treatment requirements;

the plurality of modules (100) each being formed of three mutually joined plates including a first plate (108) turned toward a first end of the stack, a second plate (109) turned toward a second end of the stack and a third intermediate plate (110), the plates each extending, substantially along the same contour, in the second and third directions substantially perpendicular to each other and perpendicular to the first direction, the modules being separated from each other, in at least one median region, in order to define intervals (106) between them for the passage of an air flow in the third direction, and the plates being stamped in order to define the channels (137-139) in each module for the circulation of the first and second heat transfer fluids in the second direction, respectively on either side of the intermediate plate (110), and having, in two end regions located on either side of said at least one median region, openings (116, 117, 124, 125, 127, 130, 131, 132, 136) for enabling the various modules to receive the first and second fluids, the plates being connected together to be sealed to the fluids around the openings, and at their periphery (111) in each module;

each plate having, in a first of said end regions, first and second openings (116, 117, 136) for the circulation of the first fluid in the two directions respectively, and a third opening (130, 131, 132) for the circulation of the second fluid in the first direction, and, in the second of said end regions, a fourth opening (124, 125, 127) for the circulation of the second fluid in the second direction.

19. The use as claimed in claim 18, in which the second loop contains between 200 and 500 g of the second fluid.

20. The heat exchanger as claimed in claim 17, wherein the highly porous heat-conducting foam is graphite.

* * * * *

UNITED STATES PATENT AND TRADEMARK OFFICE
CERTIFICATE OF CORRECTION

| | | |
|---|---|---|
| PATENT NO. | : 7,891,412 B2 | Page 1 of 1 |
| APPLICATION NO. | : 10/573961 | |
| DATED | : February 22, 2011 | |
| INVENTOR(S) | : Didier Loup et al. | |

It is certified that error appears in the above-identified patent and that said Letters Patent is hereby corrected as shown below:

Column 10, line 63, after "claims 11" please delete "and" and replace with --or--.

Signed and Sealed this
Second Day of August, 2011

David J. Kappos
*Director of the United States Patent and Trademark Office*